(12) United States Patent
Huval

(10) Patent No.: US 10,621,495 B1
(45) Date of Patent: Apr. 14, 2020

(54) METHOD FOR TRAINING AND REFINING AN ARTIFICIAL INTELLIGENCE

(71) Applicant: Direct Current Capital LLC, Wilmington, DE (US)

(72) Inventor: Brody Huval, Palo Alto, CA (US)

(73) Assignee: Direct Current Capital LLC, Wilmington, DE (US)

(\*) Notice: Subject to any disclaimer, the term of this patent is extended or adjusted under 35 U.S.C. 154(b) by 0 days.

(21) Appl. No.: 16/506,839

(22) Filed: Jul. 9, 2019

Related U.S. Application Data

(63) Continuation of application No. 15/635,177, filed on Jun. 27, 2017, now abandoned.

(51) Int. Cl.
*G06K 9/00* (2006.01)
*G06N 3/08* (2006.01)
*G06K 9/66* (2006.01)
*G01S 17/93* (2020.01)
*G01S 17/89* (2020.01)

(52) U.S. Cl.
CPC .............. *G06N 3/08* (2013.01); *G01S 17/89* (2013.01); *G01S 17/936* (2013.01); *G06K 9/00805* (2013.01); *G06K 9/66* (2013.01)

(58) Field of Classification Search
CPC .......... G06T 7/0042; G06T 7/0022; G06T 2207/30261; G06T 2207/30241; G06T 7/001; G06T 2207/30252; G06T 2207/30236; G06T 7/73; G06T 7/50; G06T 7/55; G06T 3/0068; G06T 15/04;
G06K 9/00; G06K 9/00805; G06K 9/6202; G06K 9/6279; G06K 9/00785; G06K 9/00791; G06K 9/00228; G01S 13/90; G01S 17/89; G01C 21/3602; B60K 31/00; B60K 37/06; G06F 3/013; G06F 3/0304; A63F 13/327; A63F 13/213; A63F 13/25; A63F 13/32; A63F 13/332; A63F 13/335; A63F 13/655; A63F 13/00
See application file for complete search history.

(56) References Cited

U.S. PATENT DOCUMENTS

| 9,953,236 | B1 | 4/2018 | Hunag |
| 10,037,471 | B2 | 7/2018 | Satzoda |
| 2016/0125048 | A1 | 5/2016 | Hamada |

*Primary Examiner* — Duy M Dang
(74) *Attorney, Agent, or Firm* — Polsinelli PC

(57) ABSTRACT

One variation of a method for training and refining an artificial intelligence includes: training a neural network on a training set to identify objects in optical images; receiving a manual label attributed to an optical image—recorded by a road vehicle during its operation—by a human annotator; passing the optical image through the neural network to generate an automated label attributed to the optical image; in response to the manual label differing from the automated label, serving the optical image to a human annotator for manual confirmation of one of the manual label and the automated label; appending the training set with the optical image containing one of the manual label and the automated label based on confirmation received from the human annotator; and retraining the neural network, with the training set, to identify objects in optical images.

20 Claims, 6 Drawing Sheets

METHOD FOR TRAINING AND REFINING AN ARTIFICIAL INTELLIGENCE

TECHNICAL FIELD

This invention relates generally to the field of autonomous vehicles and more specifically to a new and useful method for training and refining an artificial intelligence in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
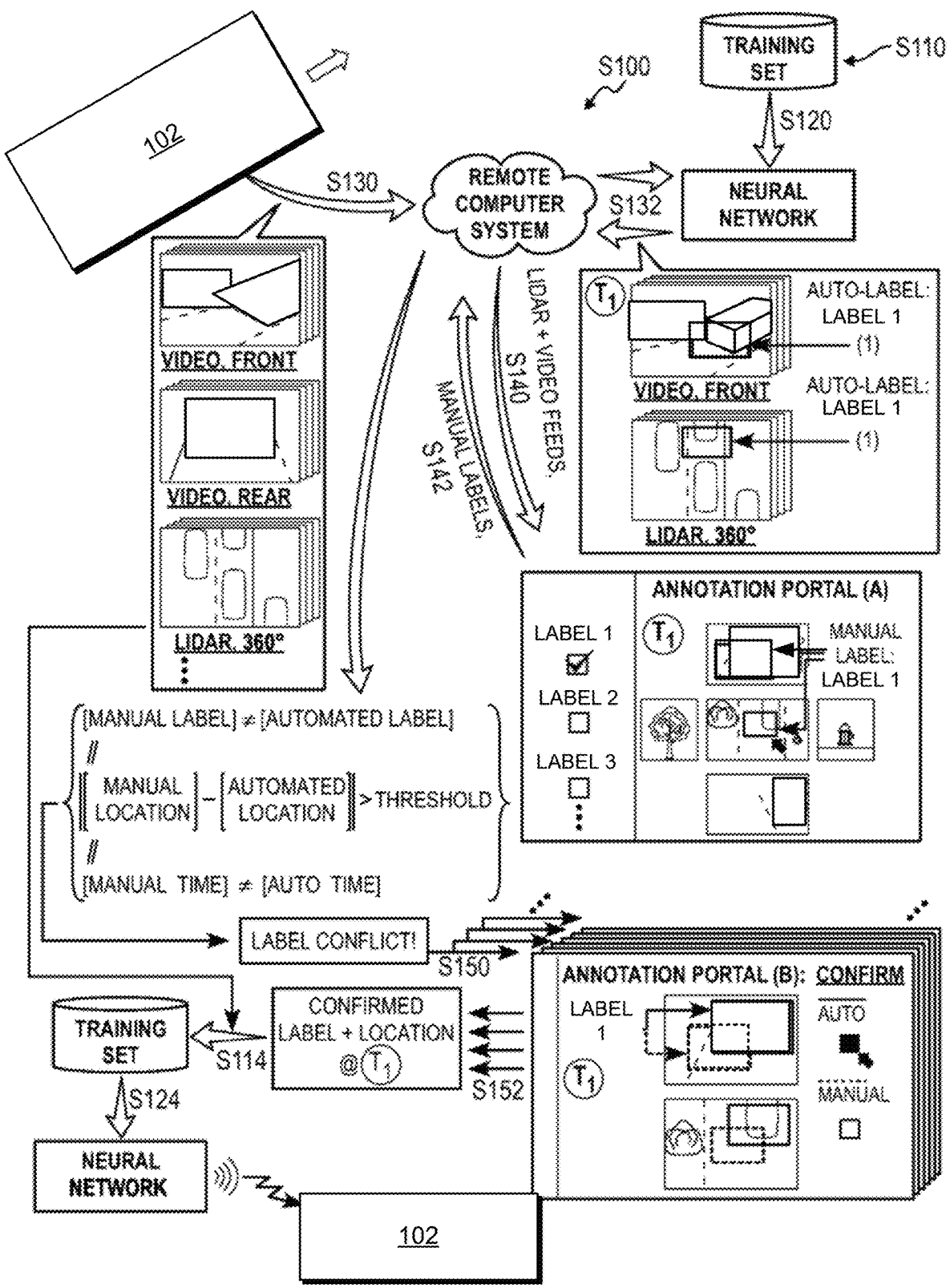
FIG. 1 is a flowchart representation of a method.

As shown in FIG. 1, a method S100 for training and refining an artificial intelligence includes: accessing a training set including optical images in Block S110, each optical image in the training set including a label linked to an object represented in the optical image; training a neural network, with the training set, to identify objects in optical images in Block S120; receiving a first optical image recorded by an optical sensor integrated into a road vehicle 102 in Block S130, the first optical image recorded during operation of the road vehicle; serving the first optical image to an annotation portal executing on a local computer system for manual labeling in Block S140; receiving a first manual label attributed to a first manually-defined location on the first optical image by a human annotator at the local computer system in Block S142; passing the first optical image through the neural network to generate a first automated label attributed to a first automatically-defined location on the first optical image in Block S132; in response to the first manually-defined location approximating the first automatically-defined location and in response to the first manual label differing from the first automated label, serving the first optical image, the first manual label, and the first automated label to the annotation portal for manual confirmation of one of the first manual label and the first automated label proximal the first manually-defined location in Block S150 and receiving confirmation of one of the first manual label and the first automated label proximal the first manually-defined location from the human annotator via the annotation portal in Block S152; appending the training set with the first optical image including one of the first manual label and the first automated label based on confirmation received from the human annotator in Block S114; and retraining the neural network, with the training set, to identify objects in optical images in Block S124.

One variation of the method S100 includes: accessing a training set including optical images in Block S110, each optical image in the training set including a label linked to an object represented in the optical image; training a neural network, with the training set, to identify objects in optical images in Block S120; receiving a first optical image recorded by an optical sensor integrated into a road vehicle in Block S130, the first optical image recorded during operation of the road vehicle; passing the first optical image through the neural network to generate a first automated label attributed to the first optical image in Block S132; serving the first optical image to a first annotation portal executing on a local computer system for manual labeling in Block S140; receiving a first manual label attributed to the first optical image by a first human annotator at the local computer system in Block S142; in response to the first manual label differing from the first automated label, serving the first optical image, the first manual label, and the first automated label to a set of annotation portals for manual confirmation of one of the first manual label and the first automated label for the first optical image by a set of human annotators in Block S150 and receiving confirmations of one of the first manual label and the first automated label for the first optical image from the set of human annotators in Block S152; appending the training set with the first optical image including one of the first manual label and the first automated label based on confirmations received from the set of human annotators through the set of annotation portals in Block S114; and retraining the neural network, with the training set, to identify objects in optical images in Block S124.

2. Applications

Generally, Blocks of the method S100 can be executed by a computer network: to collect new optical data from road vehicles; to pass these new optical data—as test data—through a neural network to automatically annotate these new optical data with labels related to localization, perception, and/or navigation of an autonomous vehicle; to serve these new optical data to human annotators for manual labeling; to detect deficiencies or defects in the neural network based on differences between these manually-generated labels and these automatically-generated labels; to automatically collect additional feedback from the human annotators to resolve such conflicts; and to retrain the neural network with these new optical data based on such additional feedback. In particular, Blocks of the method S100 can be executed by the remote computer system (and local computer systems) within a computer network to refine and grow functionality of a neural network—for identifying localization features (e.g., static objects), perception objects (e.g., dynamic objects), and/or navigational features (e.g., vehicle actions) in optical data recorded by an autonomous vehicle during autonomous operation—by selectively passing new optical data through the neural network, comparing feedback provided manually by human annotators, and retraining the neural network to resolve conflicts between features attributed to these optical data by the neural network and by the human annotators.

Because the neural network may exhibit effectiveness and accuracy in identifying localization, perception, and/or navigational features in optical data (e.g., LIDAR and video feeds) that is proportional to a volume and quality of labeled data contained in a training set on which the neural network is trained, the computer system can execute Blocks of the method S100 to automatically: collect a large volume of optical data generated at various road vehicles (e.g., manually-operated and/or autonomous vehicles); distribute these optical data to remote machines (hereinafter "local computer systems") executing annotation portals through which human annotators may review and manually label these optical data; and implement human-supplied labels (hereinafter "manual labels") and these optical data to train and refine the neural network over time. However, distribution of a large volume of optical data to local computer systems for manual labeling in order to increase a size of the training set may be relatively expensive. Similarly, manual labeling of features in optical data by one human annotator and subsequent checking of these labeled features by other human annotators—while increasing quality of the training set—may further escalate costs to develop the training set, both in terms of human labor hours per label and transmission of the same optical data to multiple local computer systems.

However, the remote computer system can execute Blocks of the method S100 to decrease a number of human labor hours and quantity of transmitted data per label while also maintaining a high label quality in order to assemble a large and accurate training set sufficient to train an effective and accurate neural network at reduced cost. In particular, the computer system can serve an optical image (e.g., a LIDAR feed and/or a video feed) to one human annotator via one local computer system, collect a manual label for the optical image from the human annotator, and compare this manual label to an automated label attributed to the optical image by the neural network. In this example, pending a match between the manual and automated labels, the remote computer system can add the optical image and the confirmed label to the training set; however, pending mismatch between the manual and automated labels, the remote computer system can redistribute the optical image to additional human annotators at other local computer systems to confirm either the manual or automated labels, thereby limiting involvement of additional human annotators to check an existing manual label to instances in which a ground truth is not known, thus limiting cost per confirmed label. Furthermore, if the neural network calculates a high confidence score for an automated label that is refuted by one or more human annotators, the remote computer system can identify a hard negative (i.e., high confidence in an incorrect output) trained into the neural network and execute steps to retrain the neural network accordingly, such as by aggregating a set of optical images—from the training set—containing labels of the same type as the automated and/or manual labels and redistributing the optical images to human annotators for relabeling before retraining the neural network on these relabeled optical images, thereby "healing" the neural network.

The remote computer system can also interface with a local computer system executing an annotation portal to selectively serve optical images of various types (e.g., LIDAR and/or video feeds) to a human annotator for labeling, which may reduce total volume of data transmitted to human annotators per label attributed to an optical image. The remote computer system can also cooperate with the local computer system to provide automated tools to the human annotator to improve accuracy and speed at which the human annotator may label optical images, as described below, thereby further reducing cost per label.

Therefore, the remote computer system can execute Blocks of the method S100 in order to: reduce total volume of data transmitted to local computer systems per localization, perception, and/or navigational label attributed to optical data by human annotators; reduce time spent by human annotators attributing these optical data with labels; increase accuracy of labels attributed to these optical data by human annotators; and automatically detect and handle conflicting labels collected from human annotators and generated by the neural network over time in order to develop a larger, more accurate training set that may yield a more effective, accurate neural network.

As the neural network is thus developed and refined, the neural network may be implemented in an autonomous vehicle to autonomously localize the autonomous vehicle, perceive an environment around the autonomous vehicle, and navigate the autonomous vehicle to a selected destination.

3. Autonomous Vehicle

The method S100 can be executed by a computer system (e.g., a remote server) in conjunction with an autonomous vehicle. The autonomous vehicle can include: a suite of sensors configured to collect information about the autonomous vehicle's environment; local memory storing a navigation map defining a route for execution by the autonomous vehicle and a localization map that the autonomous vehicle implements to determine its location in real space; and a controller. The controller can: determine the location of the autonomous vehicle in real space based on sensor data collected from the suite of sensors and the localization map; determine the context of a scene around the autonomous vehicle based on these sensor data; elect a future action (e.g., a navigational decision) based on the context of the scene around the autonomous vehicle, the real location of the autonomous vehicle, and the navigation map, such as further based on a deep learning and/or artificial intelligence model; and control actuators within the vehicle (e.g., accelerator, brake, and steering actuators) according to elected decisions.

In one implementation, the autonomous vehicle includes one or more 360° LIDAR sensors arranged on the top of the autonomous vehicle, such as at each of the front and rear of the autonomous vehicle. Each LIDAR sensor can output one three-dimensional distance map—such as in the form of a 3D point cloud representing distances between the LIDAR sensor and external surface within the field of view of the LIDAR sensor—per rotation of the LIDAR sensor (i.e., once per scan cycle). The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field. The autonomous vehicle can also include one or more color cameras facing outwardly from the front, rear, and left lateral and right lateral sides of the autonomous vehicle. For example, each camera can output a video feed containing a sequence of digital photographic images (or "frames"), such as at a rate of 20 Hz. Furthermore, the autonomous vehicle can include a set of infrared proximity sensors arranged along the perimeter of the base of the autonomous vehicle and configured to output signals corresponding to proximity of objects and pedestrians within one meter of the autonomous vehicle.

The autonomous vehicle can also implement one or more local neural networks to process LIDAR feeds (i.e., sequences of LIDAR images), video feeds (or sequences of color photographic images), and/or other sensor data substantially in real-time in order to localize the autonomous vehicle to a known location and orientation in real space, to interpret (or "perceive") its surroundings, and to then select and execute navigational actions. For example, a controller integrated into the autonomous vehicle can: pass LIDAR and video feeds into a localization/perception neural network to detect and characterize static objects—such as lane markers, lane reflectors, curbs, road signs, telephone poles, and building facades—near the autonomous vehicle substantially in real-time; and then compare types and relative locations of these static objects to a localization map to determine the autonomous vehicle's position in real space. In this example, the neural network can also detect and characterize dynamic objects—such as other vehicles, pedestrians, and cyclists—in the LIDAR and video feeds; and the controller can perceive the autonomous vehicle's local environment based on proximity, speed, and types of these nearby dynamic objects. The controller can then select a next navigational action—such as including a target wheel angle, road speed, acceleration, or deceleration (e.g., brake position)—to move toward a specified destination based on the autonomous vehicle's current position and the scene around the vehicle, such as by passing the autonomous vehicle's position, identified dynamic objects in the local scene, and the autonomous vehicle's destination into a navigational model (e.g., a navigating neural network).

The autonomous vehicle can therefore implement one or more neural networks locally to determine its location, perceive its surroundings, and select future actions. The remote computer system can implement Blocks of the method S100: to collect LIDAR, video, and/or other optical data from the autonomous vehicle, other autonomous vehicles, and/or manually-operated road vehicles with similar sensor suites; to interface with human annotators to attribute localization-, perception-, and motion planning-related labels to these optical data; and to generate and refine localization/perception, navigational, and/or other neural networks—for implementation by these autonomous vehicles—over time.

The method S100 is described herein as executed in conjunction with a ground-based passenger, commercial, or fleet vehicle. However, Blocks of the method S100 can be executed in conjunction with a wheeled vehicle of any other type.

4. Training Set

Block S110 of the method S100 recites accessing a training set including optical images, wherein each optical image in the training set includes a label linked to an object represented in the optical image. Generally, in Block S110, the remote computer system aggregates labeled optical data, such as stored in a remote database, into a training set on which a localization, perception, motion planning, and/or other neural network can then be trained.

For example, the remote computer system can access: still LIDAR images, still color photographic images, LIDAR feeds, and/or video feeds recorded by multiple (e.g., a fleet) autonomous vehicles and/or manually-operated vehicles while in operation over time; and labels for static (e.g., localization) objects, dynamic (e.g., perception) objects, and navigational actions previously attributed to these optical data by human annotators during a previous instantiation of the method S100 hosted by the remote computer system. The remote computer system can then package these optical data and labels into a training set in Block S110.

5. Training the Artificial Intelligence

Block S120 of the method S100 recites training a neural network, with the training set, to identify objects in optical images. Generally, in Block S120, the remote computer system can implement machine learning techniques to automatically develop a computational model (or "neural network") for detecting and identifying (e.g., labeling, classifying) localization objects, perception objects, and navigational actions in optical data based on the training set.

For example, the remote computer system can implement steepest descent, quasi-Newton, or conjugate gradient techniques: to train a localization/perception neural network to detect and classify static and dynamic objects related to localization of an autonomous vehicle and perception of a scene around the autonomous vehicle in singular frames of LIDAR and/or color photographic images; and to train a motion planning neural network to output navigational action selections for an autonomous vehicle based on LIDAR and/or video feeds.

6. New Optical Data

Block S130 of the method S100 recites receiving a first optical image recorded by an optical sensor integrated into a road vehicle, wherein the first optical image was recorded during operation of the road vehicle. Generally, in Block S130, the remote computer system accesses optical data recently recorded by a road vehicle and not yet incorporated into the training set, as shown in FIG. 1. For example, a road vehicle (e.g., an autonomous vehicle or a manually-operated road vehicle) outfitted with multiple LIDAR sensors and multiple color cameras can record LIDAR and video feeds throughout operation. When the vehicle is later parked and establishes a connection to a high-bandwidth wireless (e.g., Wi-Fi) network, the vehicle can upload these optical data to the remote computer system via a computer network (e.g., the Internet). In this example, the remote computer system can store these optical data in a remote database and queue these optical data for transmission to human annotators for manual labeling.

6.1 LIDAR Feed

Figure 2A:
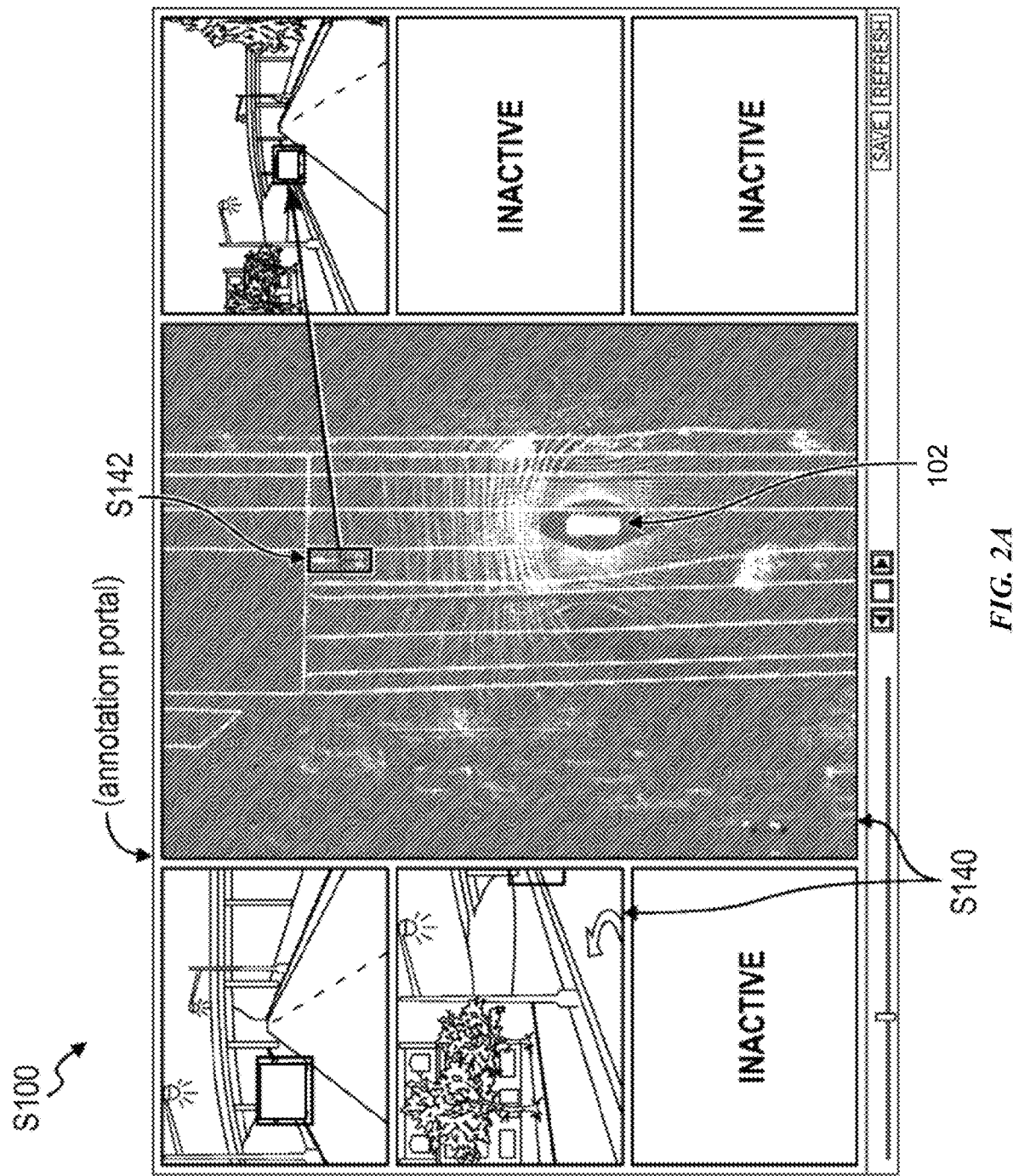
FIGS. 2A and 2B are graphical representations of one variation of the method.
Figure 2B:
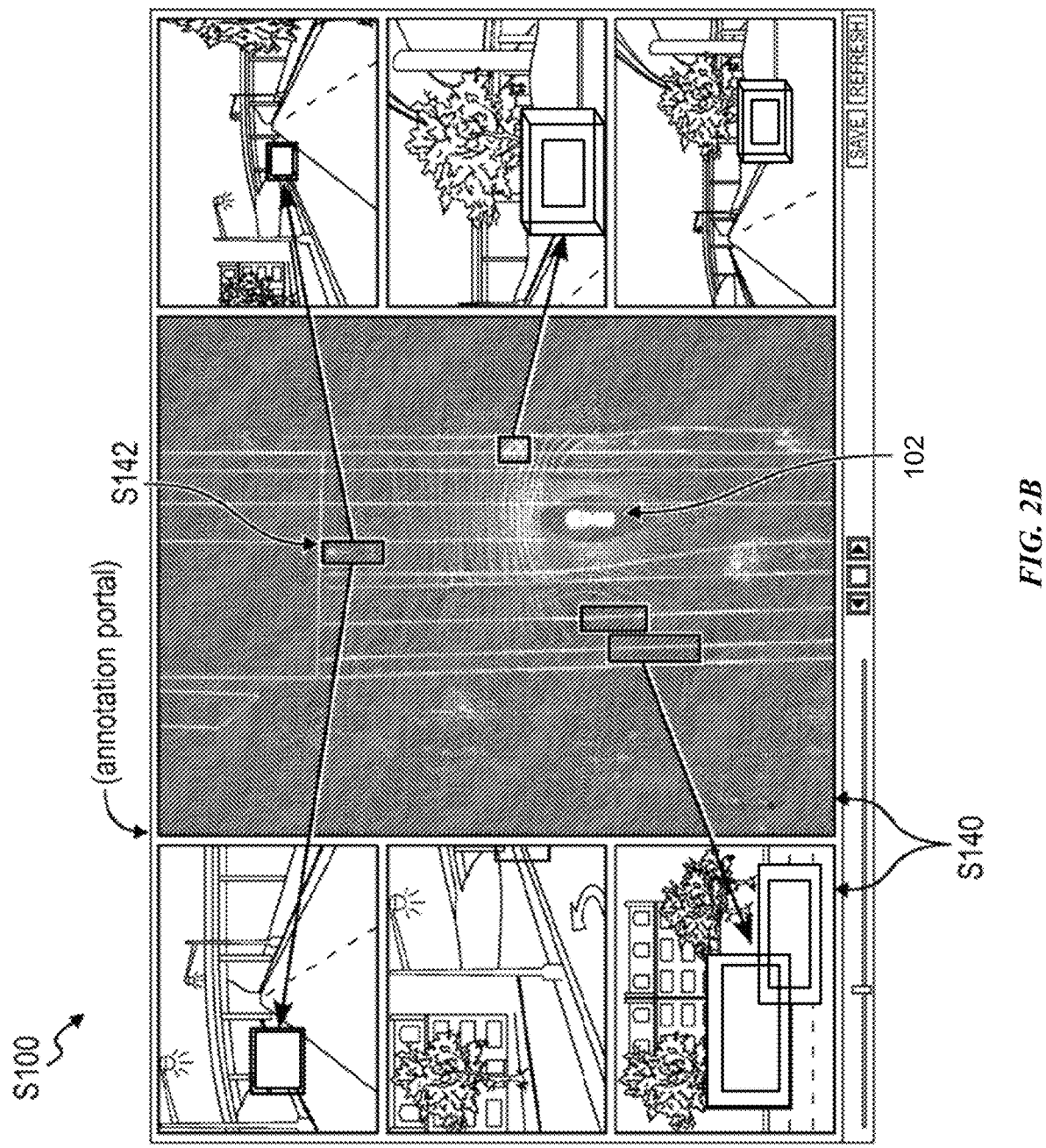

In one implementation, the remote computer system downloads a LIDAR feed—recorded by a LIDAR sensor integrated into the road vehicle and including a sequence of optical images (or "frames")—from the road vehicle. In this implementation, optical images can include a point cloud representing positions of external surfaces in the field of view of the LIDAR sensor (e.g., a distance from the LIDAR sensor to surfaces in the first around the LIDAR sensor) at a time the optical images were recorded, as shown in FIGS. 1, 2A, and 2B.

In this implementation, the remote computer system can download multiple discrete LIDAR feeds from the road vehicle and stitch these discrete LIDAR feeds into one composite LIDAR feed, such as based on known positions of LIDAR sensors on the road vehicle. Alternatively, the road vehicle can generate the composite LIDAR feed and return this to the system in Block S130.

The remote computer system can also filter the LIDAR feed (or composite LIDAR feed) to reduce its size and/or to improve visual comprehension for a human annotator (e.g., to reduce volume of data transmission and increase label quality). For example, each optical image in the LIDAR feed can include a dense three-dimensional point cloud representing external surfaces proximal the road vehicle at a time the optical image was recorded by the LIDAR sensor. The remote computer system can then: remove a subset of points representing a ground surface (e.g., a "ground plane") from the first optical image; and filter out noise and dense dusters of points from the remaining point cloud to produce a sparse three-dimensional point cloud. The remote computer system can then compress the lower-density three-dimensional point cloud onto a horizontal plane to form a sparse two-dimensional plan (i.e., overhead) point cloud containing a fraction of the data in the original optical image but that may be more easily interpreted and labeled by a human annotator.

The remote computer system can repeat this process for each other optical image in the LIDAR feed and aggregate these two-dimensional plan point clouds into a sparse two-dimensional plan LIDAR feed before serving the sparse two-dimensional plan LIDAR feed to a human annotator for labeling.

6.2 Video Feed

In Block S110, the remote computer system can also download a video feed—from the road vehicle—recorded by a color camera integrated into the road vehicle and including digital photographic images of a field proximal the road vehicle, such as approximating a two-dimensional elevation view. For example, the road vehicle can: fuse multiple LIDAR feeds into a composite LIDAR feed, such as described above; record multiple video feeds—temporally aligned to frames in the composite LIDAR feed—through multiple color cameras arranged on the road vehicle, such as including a first video feed recorded by a first color camera arranged in a first position on the road vehicle and a second video feed recorded by a second color camera arranged in a second position on the road vehicle; and then upload the composite LIDAR feed and these discrete video feeds to the remote computer system. The first video feed can thus include digital photographic images of a first field around the road vehicle; and the second video feed can include color photographic images of a second field, distinct from the first field, around the road vehicle. The remote computer system can then link the first video feed to a first sector within the LIDAR feed based on the first known position of the first camera on the road vehicle; and link the second video feed to a second sector within the LIDAR feed based on the second known position of the second camera on the road vehicle; etc.

However, the remote computer system can collect any other optical data in any other format from the road vehicle in Block S130. The remote computer system can also access GPS data, inertial data, and navigational actions (e.g., wheel angle, accelerator position, brake position, etc.) from the road vehicle in Block S130.

7. Automated Label for New Optical Image

Figure 3:
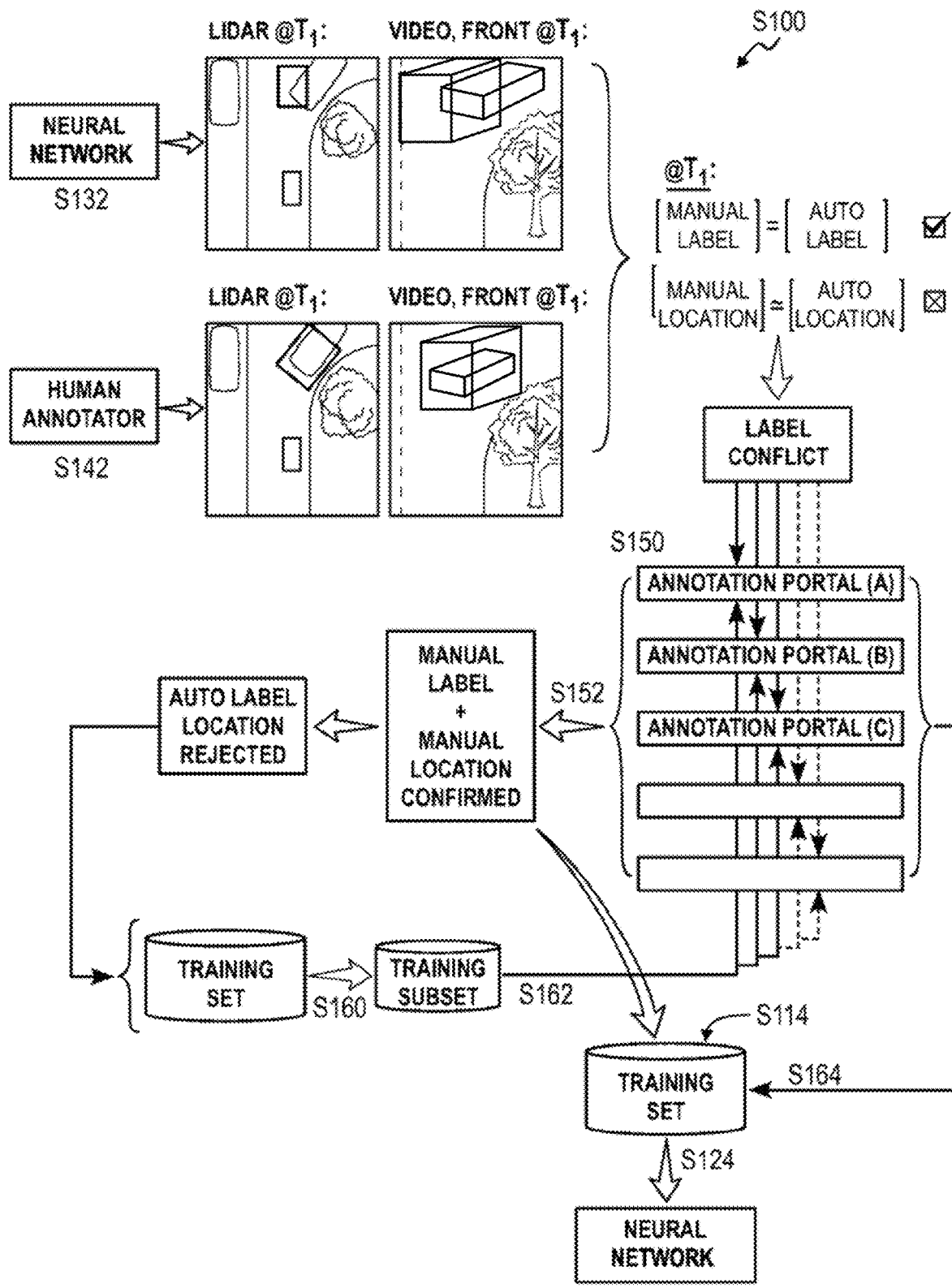
FIG. 3 is a flowchart representation of one variation of the method.

Block S132 recites passing the first optical image through the neural network to generate a first automated label attributed to a first automatically-defined location on the first optical image. Generally, in Block S132, the remote computer system can pass a new optical image into a neural network, which can then automatically detect and identify objects (or "features") in the new optical image and write labels for these objects onto corresponding regions of the new optical image, as shown in FIGS. 1 and 3.

For example, the remote computer system can maintain a master localization/perception neural network; in Block S132, the remote computer system can pass a new optical image—such as in the form of a singular LIDAR frame, a single video frame, a segment of LIDAR feed, or segment of a video feed—into the master localization/perception neural network to automatically detect and identify fixed infrastructure objects, to detect and identify dynamic objects, and to associate automated labels representing distinct types of these objects with discrete locations within the optical image (hereinafter "automatically-defined locations"). In this example, the remote computer system can implement the master localization/perception neural network to label objects represented in optical images prior to sending these optical images to human annotators for manual labeling or after manual labels for these optical images have been received from human annotators.

Alternatively, for the road vehicle that includes an autonomous vehicle executing a local version of the localization/perception neural network, the road vehicle can pass new optical images through its local version of the localization/perception neural network to attribute automated labels to distinct regions in these optical images prior to uploading these optical images to the remote computer system. For example, an autonomous vehicle can pass a first optical image through its local version of the neural network during operation of the road vehicle in order to generate a first automated label attributed to a first automatically-defined location in the first optical image in Block S132, such as during autonomous execution of a route; and the remote computer system can collect the first optical image, the first automated label, and a pointer to the first automatically-defined location in the first optical image from the autonomous vehicle in Block S130.

The neural network can also calculate a confidence score for each automated label attributed to an automatically-defined location in an optical image. For example, the (global or local) neural network can: detect an object in an optical image; calculate a first confidence score that the object is a first object type represented by a first automated label; and calculate a second confidence score—less than the first confidence score—that the object is a second object type represented by a second automated label; etc. for a set of possible object types of the object. The remote computer system (or the autonomous vehicle) can then: write the first automated label to the object if the first confidence score significantly exceeds confidence scores for all other automated labels and exceeds a preset threshold score; and serve the first automated label with the optical image to a human annotator for confirmation in Block S140. However, if the first, highest confidence score is similar to a second, next-highest confidence score of a second automated label for the object and the first and second confidence scores exceed the preset threshold score, the remote computer system can serve both the first automated label and the second automated label with the optical image to a human annotator for confirmation of one of these two labels in Block S140. Similarly, if the first, highest confidence score is less than the preset threshold score, the remote computer system can serve the optical image without automated labels to a human annotator for manual labeling in Block S140. The remote computer system can therefore selectively distribute automated labels to human annotators in Block S140 based on confidence scores calculated for automated labels in Block S132, as described below.

The remote computer system and/or the road vehicle can implement global or local versions of the localization/perception neural network to write one or multiple automated labels to discrete locations or regions within an optical image. The remote computer system and/or road vehicle can repeat this process for each frame or each cluster of frames in a LIDAR feed and/or in a video feed in Block S132, such as before or after these optical data are labeled by a human annotator.

8. Manual Label

Block S140 of the method S100 recites serving the first optical image to an annotation portal executing on a local computer system for manual labeling; and Block S142 of the method S100 recites receiving a first manual label attributed to a first manually-defined location on the first optical image by a human annotator at the local computer system. Generally, the remote computer system provides optical images to a human annotator for insertion of a manual label and/or manual confirmation of an automated label, such as through an annotation portal executing on a local computer system (e.g., a desktop computer), in Block S140 and then collects feedback from the human annotator via the annotation portal in Block S142, as shown in FIGS. 1, 2A, 2B, and 3.

8.1 Annotation Portal

The remote computer system can send LIDAR and/or video feeds to the annotation portal—executing on a local computer system—via a computer network (e.g., the Internet) and can similarly receive labels for these feeds and pointers to discrete coordinates (e.g., pixels) or regions of these feeds for which these labels are applicable from the annotation via the computer network. For example, the annotation portal can execute on a desktop computer, can render frames of LIDAR and video feeds for review by a human annotator, and can host a variety of tools for inserting object labels of various types into discrete frames of the LIDAR and video feeds and/or for activating and deactivating action labels of various types throughout a sequence of LIDAR and video feeds, as described below.

A first instance of the annotation portal can execute on a first local computer system to assist a first human annotator with manually labeling optical images. Additional instances of the annotation portal can execute on other machines to label other optical images and/or to check or confirm labels affiliated with optical images by the first human annotator.

However, the annotation portal can execute on a machine or local computer system of any other type and to enable a human annotator to label optical images in any other way.

8.2 Feeds

As described above, the remote computer system can serve a sparse two-dimensional plan LIDAR feed to the annotation portal for labeling by the human annotator in Block S140. The remote computer system can also serve one or more video feeds recorded by the same road vehicle over the same period of time as the original LIDAR feed, and the annotation portal can render these video feeds adjacent the sparse two-dimensional plan LIDAR feed in order to provide additional visual support to the human annotator when annotating the sparse two-dimensional plan LIDAR feed. Specifically, the human annotator can label the sparse two-dimensional plan LIDAR feed directly but can view video feeds synchronized to the sparse two-dimensional plan LIDAR feed within the annotation portal in order to better distinguish and comprehend objects represented by points in the sparse two-dimensional plan LIDAR feed.

For example, the remote computer system can serve video feeds recorded by forward-facing, rear-facing, left-facing, and right-facing cameras in the road vehicle and the sparse two-dimensional plan LIDAR feed to the annotation portal. In this example, the annotation portal can render the sparse two-dimensional plan LIDAR feed and the forward-facing video feed above, the rear-facing video feed below, the left-facing video feed to the left of, and the right-facing video feed to the right of and synchronized to the sparse two-dimensional plan LIDAR feed. The human annotator can then review the video feeds—approximating elevation views—to visually discern and identify objects in the field around the road vehicle while directly annotating the LIDAR feed, which approximates a plan view of the field around the road vehicle. Therefore, the annotation portal can: render frames in a LIDAR feed for labeling by the human annotator; collect manual labels applied to optical images in the LIDAR feed; and render digital photographic images in a video feed adjacent and synchronized with the LIDAR feed to provide more easily-consumed visual content to the human annotator while labeling the LIDAR feed.

However, the computer system can serve one or more video feeds exclusively, LIDAR feeds exclusively, or any other combination of optical data to the annotation portal for manual labeling by the human annotator in Block S140.

8.3. Manual Label Insertion

In one implementation shown in FIGS. 1, 2A, and 2B, the annotation portal supports insertion of labels onto optical images via placement of labeled boundary boxes around areas of interest within these optical images. For example, the annotation portal can: render a sparse two-dimensional plan LIDAR feed; receive selection of a manual label of a first type; render a virtual bounding box linked to a cursor and defining a geometry associated with the first type of the first manual label; locate the bounding box within a first frame in the sparse two-dimensional plan LIDAR feed based on a position of a cursor input over the first optical image; and then label a cluster of points contained within the bounding box as representing an object of the first type. For each point cluster in the cluster of points, the annotation portal can return an identifier of the point and a manual label specifying the first object type in Block S142. The remote computer system can then aggregate these discrete points in the cluster into a first manually-defined region of a first object of the first type in the first frame—representing a field around the road vehicle at a corresponding instant in time—and attribute this manual label with the first manually-defined region within the first frame.

In this implementation, the annotation portal can enable a human annotator to pre-select an object type, such as from a dropdown menu, hotkey, etc. For example, the annotation portal can host a set of object types related to perception, such as road vehicle (e.g., passenger vehicles, commercial trucks, motorcycles), pedestrian, cyclist, debris, temporary construction obstacles (e.g., road cones), and other dynamic (i.e., movable) objects. The annotation portal can additionally or alternatively host a set of object types related to localization, such as traffic signals, road signs, curbs, lane markers, lane reflectors, bus tops, fire hydrants, medians, trees, telephone poles, buildings, and other static objects.

For example, to label a vehicle in a LIDAR feed, the human annotator can select a passenger vehicle-type label from the dropdown menu or hotkey; the annotation portal can then activate a vehicle bounding box scaled to represent a common size of a passenger vehicle at a zoom level at which the LIDAR feed is currently rendered in the annotation portal. As the human annotator moves a cursor over the LIDAR feed, the annotation portal can render the vehicle bounding ties to the cursor. The annotation portal can then: receive a cursor selection—during playback of the LIDAR feed—when the cursor occupies a first location over a first LIDAR frame rendered in the annotation portal; locate the vehicle bounding box at the first location in the first frame; write a vehicle-type label to points in the first LIDAR frame contained within the bounding box; and return a label packet—including an identifier of the first LIDAR frame (e.g., timestamp, LIDAR feed ID, and vehicle ID), identifiers of these points (e.g., point address or number) in the first LIDAR frame, and the vehicle-type label which may contain significantly less data than the LIDAR frame itself—to the remote computer system in Block S142.

In the foregoing example, as the annotation portal continues to replay the LIDAR feed, the annotation portal can preserve the relative location of this vehicle bounding box within the LIDAR feed until moved by the human annotator (e.g., assuming that the vehicle represented within the bounding box is parked) and repeat the foregoing methods and techniques to label points within the bounding box in these subsequent frames with the passenger vehicle-type label.

In another example, to label a pedestrian in the LIDAR feed, the human annotator can select a pedestrian-type label from the dropdown menu or hotkey; the annotation portal can then activate a pedestrian bounding box scaled to represent a common size of a pedestrian at a zoom level at which the LIDAR feed is currently rendered in the annotation portal. The human annotator can then click pixels, points, or dusters of points in the LIDAR feed to place the pedestrian bounding box over one or more pedestrians. The annotation portal can then label points contained within the bounding box(es) as representing pedestrians and return a label packet—including an identifier of the first LIDAR frame, identifiers of these points in the first LIDAR frame, and the pedestrian-type label—to the remote computer system in Block S142.

Alternatively, in the foregoing implementation, the annotation portal can enable the human annotator to first select or draw a bounding box around a point, duster of points, line, surface, or volume represented in a LIDAR frame and to then select a label—from a dropdown or other menu—to write these features in the LIDAR frame. The annotation portal can then return a label pack for the LIDAR frame to the remote computer system accordingly in Block S142. However, the annotation portal can enable the human annotator to label points, clusters of points, or any other region of a LIDAR image with any other object label in any other way.

In another implementation, the annotation portal can enable the human annotator to label lane markers within a video feed. For example, the annotation portal can enable the human annotator to draw a line or arc over a solid lane marker or over a sequence of intermittent lane markers shown within a frame of a video feed; alternatively, the annotation portal can enable the human annotator to draw a box around intermittent lane markers (or lane reflectors) within the frame. The annotation portal can then: generate a label layer for the frame, such as in the form of an empty matrix scaled to the frame; write an identifier of the frame to the label layer; write a lane marker-type label to a region in the label layer corresponding to pixels or to a region within the frame extending along the line or bounded by the box defined by the human annotator; and then return the label layer—which may contain significantly less data than the original frame of the video feed—to the remote computer system in Block S142.

The annotation portal can implement similar methods and techniques to generate label packets for other perception- and localization-related objects, such as including multiple discrete object types per frame in the LIDAR feed. The annotation portal can implement similar methods and techniques to collect manual labels attributed to other manually-defined regions of LIDAR and/or video feeds as the human annotator views these LIDAR and/or video feeds within the annotation portal.

8.4 Label Selection from Pre-Populated Automated Label List

In another implementation in which the remote computer system passes a new optical image through a neural network to automatically annotate the optical image, the remote computer system can serve one or more automated labels per optical image—in a LIDAR or video feed—to the annotation portal, and the annotation portal can preload the optical image with these automated labels for manual confirmation or manual replacement by the human annotator.

In one example, the remote computer system passes a first optical image through the neural network in Block S132 to: detect an object at a first automatically-defined location within the first optical image; to calculate a first confidence score that the first object is of a first type; to calculate a second confidence score that the first object is of a second type; etc. In this example, if the first confidence score exceeds a preset threshold score (e.g., 60%) and exceeds the second confidence score, the remote computer system can serve—to the annotation portal—the first optical image with a first automated label attributed to the first automatically-defined location to define the first object as of the first type; the annotation portal can then render the first optical image and the first label over or linked to the first automatically-defined location for confirmation or replacement with a label of another type by the human annotator. Therefore, in this example, the annotation portal can present a pre-generated automated label for an object detected at an automatically-defined location by the neural network; the human annotator can then confirm the type and location of the automated label, confirm the automated label but adjust (e.g., move, shift) the automatically-defined location for the automated label, or reject the automated label and replace the automated label with a manual label of a different type in a manually-defined location. The remote computer system can also recalculate the confidence score for the pre-generated automated label based on feedback received from the human annotator.

However, in the foregoing example, if the first confidence score and the second confidence score—output by the neural network for the first and second object types in Block S132—are substantially similar (e.g., a clear frontrunner of automated labels is not indicated via confidence scores), the remote computer system can serve—to the annotation portal—the first optical image with both a first automated label for the first object type and a second automated label for the second object type linked to the first automatically-defined location within the first optical image. The annotation portal can then render the first optical image with both the first label and the second label linked to the first automatically-defined location with a prompt for the human annotator to confirm one of the first and second automated labels or to manually enter an alternate label for another object type. Therefore, in this example, the annotation portal can present a pre-populated set of possible automated labels for an object detected at an automatically-defined location by the neural network; the human annotator can then confirm presence of an object at the automatically-defined location, shift the automatically-defined location to a position in the optical image to better align with an object represented in the optical image, and confirm an automated label in the pre-populated list or provide an alternate manual label.

Furthermore, in the foregoing example, if all confidence scores of object types calculated by an object detected in an optical image remain below the preset threshold score, the annotation portal can withhold presentation of automated labels with the optical image; and the human annotator can manually indicate an object, manually select an object type, and manually attribute this object type with the object to insert a manual label into the optical image, such as described above. However, in this example, the annotation portal can also reorder object types available for selection in a dropdown or other menu according to confidence scores of object types output by the neural net in Block S132.

Therefore, by selectively presenting the optical image with one or multiple pre-generated automated labels to the human annotator, the annotation portal can streamline manual labeling by the human annotator, reduce time spent (and therefore cost) per inserted or confirmed manual label, and improve accuracy of manual labeling by the human annotator.

The remote computer system and annotation portal can repeat this process for each optical image—within a LIDAR or video feed—served to the human annotator to dynamically preset high-confidence automated labels to the human annotator and to withhold lower-confidence automated labels from the human annotator for these optical images in order assist the human annotator in manually labeling these optical images over time.

8.5 Label Projection from LIDAR to Video Feeds

In another implementation shown in FIGS. 1 and 3, the annotation portal project labels are inserted into the LIDAR feed onto corresponding regions in a video feed rendered simultaneously within the annotation portal in order to provide additional feedback to the human annotator regarding object type and placement of a manual label within the LIDAR feed. In particular, the annotation portal can: render a first frame of a LIDAR feed (e.g., a sparse two-dimensional plan point cloud) and a first frame of a video feed (e.g., a first digital photographic image) substantially simultaneously within the annotation portal; and, in response to insertion of a first manual label onto a first manually-defined location within the first LIDAR frame, the annotation portal can project the first manual label from the first manually-defined location in the first LIDAR frame onto a corresponding location in the first video frame substantially in real-time.

For example, the LIDAR feed can include distance data projected onto a 2D horizontal plane (e.g., compressed into an overhead representation road vehicle and its surroundings), and video feeds can include sequences of 2D images, each of which represents a field of view projected onto a 2D plane nonparallel to the horizontal plane of the LIDAR feed, as described above. In this example, when a vehicle-type label is inserted into a first LIDAR frame, the annotation portal can: calculate an angular position of the vehicle-type label relative to an anteroposterior axis of the road vehicle in the first LIDAR frame; calculate a horizontal position of the vehicle-type label in the first video frame based on the angular position of the vehicle-type label and a known position of a camera that recorded the first frame relative to the anteroposterior axis of the road vehicle; locate the vehicle-type label at the vertical center or slightly below the vertical center of the first frame, which may correlate well to a top or center of other road vehicles; and then update the first frame to include the vehicle-type label at this horizontal and vertical position. As the LIDAR and video frames are played forward, the annotation portal can implement similar methods and techniques to project the same vehicle-type label onto subsequent video frames, such as until the human annotator deactivates the vehicle-type label or moves the vehicle-type label to a different position on the LIDAR feed.

The annotation portal can therefore update video frames substantially in real-time to visually communicate to the human annotator: a location of a manual label inserted into a sparse two-dimensional plan LIDAR frame, which contains distance values compressed on a single horizontal plane and that may be difficult for the human annotator to digest visually; and a location of the same manual label projected onto a two-dimensional color photographic image that may be easier for the human annotator to digest visually, therefore enabling the human annotator to place, review, and edit annotations with greater efficiency and accuracy.

8.6 Selective Video Feeds

As described above, the remote computer system can link a video feed to a sector in the LIDAR feed representing surfaces also shown in the video feed. To limit a total volume of data transmitted to the annotation portal per manual label supplied by the human annotator while also providing the human annotator sufficient LIDAR and video data to yield high label accuracy, the remote computer system can cooperate with the annotation portal to selectively activate and deactivate video feeds served to the local computer system and rendered with the LIDAR feed based on corresponding sectors of the LIDAR feed in the process of being labeled by the human annotator.

In one example, in Block S130, the remote computer system: downloads a first video feed—recorded by a first camera integrated into the road vehicle and including digital photographic images of a first field around the road vehicle—from the road vehicle; downloads a second video feed—recorded by a second camera integrated into the road vehicle and including digital photographic images of a second field, distinct from the first field, around the road vehicle—from the road vehicle; links the first video feed to a first sector within the LIDAR feed based on a known position of the first camera on the road vehicle; and links the second video feed to a second sector—different from the first sector—within the LIDAR feed based on a known position of the second camera on the road vehicle. In this example, the annotation portal can query the remote computer system for digital photographic images in the first video feed when a cursor is positioned over the first sector of the LIDAR feed and query the remote computer system for digital photographic images in the second video feed when the cursor is positioned over the second sector of the LIDAR feed. The remote computer system can selectively return frames from the first and second video feeds to the annotation portal accordingly in Block S140, and the annotation portal can selectively render these frames from the first video feed and the second video feed adjacent and synchronized with the LIDAR feed within the annotation portal, as shown in FIG. 2A.

The annotation portal can therefore track the position of a cursor over the LIDAR feed when the LIDAR feed is stopped on one frame or as the LIDAR feed is replayed within the annotation portal. By projecting the location of the cursor within the LIDAR feed onto fields of view represented by corresponding video feeds, the annotation portal can identify a subset (e.g., one or two) of these video feeds that contain a representation of the same surface or object represented in a region of the current LIDAR frame occupied by the cursor. The annotation portal can then activate this subset of video feeds and deactivate (i.e., disable download of) other video feeds in the set in order to reduce a total volume of data downloaded per labeled LIDAR frame while continuing to provide the human annotator with video data relevant to a region of interest in the LIDAR feed—as indicated by the location of the cursor—thereby also maintaining high manual label accuracy.

8.7 Filtering and Interpolation

In yet another implementation, the remote computer system can reduce human annotator time and reduce a total volume of data transmitted to the local computer system (and therefore reduce total cost) per labeled segment of LIDAR and/or video feed by: serving compressed versions of these LIDAR and video feeds to the annotation portal; collecting manual labels and manually-defined locations for these labels from the human annotator via the annotation portal; and then upsampling these labels to the original or higher-resolution versions of these LIDAR and video feeds.

In one example, the remote computer system compresses the original LIDAR feed according to a static compression model in which a subset of frames—such as every other frame, one frame in every ten, or one frame per second—in the original LIDAR feed are aggregated into a compressed LIDAR feed, which is then served to the local computer system in Block S140 for presentation to and manual labeling by the human annotator.

Alternatively, the computer system can compress the original LIDAR feed according to a rate inversely proportional to a speed of the road vehicle at the time the original LIDAR feed was recorded. For example, the remote computer system can access speed data for the road vehicle over a period of time during which the LIDAR feed was recorded and implement: a high degree of compression (e.g., one frame per two-second interval) for LIDAR frames corresponding to periods in which the road vehicle is stopped; a moderate degree of compression (e.g., one frame per one-second interval) for LIDAR frames corresponding to periods in which the road vehicle is moving below to miles per hour; a low degree of compression (e.g., one frame per 500-millisecond interval) for LIDAR frames corresponding to periods in which the road vehicle is moving between to and 35 miles per hour; and no compression (e.g., 15 frames per second) for LIDAR frames corresponding to periods in which the road vehicle is moving at speeds greater than 35 miles per hour.

In the foregoing examples, the computer system can compress original video feeds according to the same compression models to generate compressed video feeds containing video frames corresponding in time to LIDAR frames in the compressed LIDAR feed; the computer system can then serve these compressed video feeds to the local computer system in Block S140, as described above.

In this implementation, the annotation portal can record manual labels written to manually-defined locations across a sequence of LIDAR frames in the compressed LIDAR feed and then return these manual labels and corresponding manually-defined locations to the remote computer system; and the remote computer system can interpolate manual labels between corresponding manually-defined locations to inject labels into unlabeled frames in the original LIDAR feed. For example, the annotation portal can: record a first manual label defining a first dynamic object type (e.g., a another vehicle, a pedestrian) at a first manually-defined location in a first LIDAR frame in the compressed LIDAR feed; record a second manual label defining the first dynamic object type at a second manually-defined location within a second LIDAR frame in the compressed LIDAR feed; and then return—to the remote computer system—the first manual label, a definition or pointer for the first manually-defined location in the first LIDAR frame, the second manual label, and a definition or pointer for the second manually-defined location in the second LIDAR frame. In this example, the remote computer system can then interpolate a third location of a third label of the first dynamic object type in a third frame—between the first frame and the second frame in the original LIDAR feed but not included in the compressed LIDAR feed—based on the first manually-defined location and the second manually-defined location linked to manual labels specifying the first dynamic object type.

However, the computer system can implement any other methods or techniques: to compress a LIDAR feed; to collect manual labels for objects represented in the compressed LIDAR feed; and to project these labels and their manually-defined locations from the compressed LIDAR feed onto the original (i.e., complete) LIDAR feed to reduce human labeling time and a total volume of data served to the human annotator without yielding a substantial decrease in quality or accuracy of these manual labels and their positions within the original LIDAR feed. The remote computer system can cooperate with the annotation portal to similarly project manual labels from video frames in a compressed video feed onto video frames in an original video feed.

8.8 Manual Label Collection

The annotation portal can therefore interface with the human annotator to record a manual label specifying a particular object type in a particular manually-defined location within a LIDAR frame. In one example, the annotation portal stores this manual label, the manually-defined location (e.g., addresses or coordinates of discrete points in the LIDAR frame), and a link to the LIDAR frame (e.g., a timestamp of the LIDAR frame, an identifier of the LIDAR feed, an identifier of the corresponding road vehicle, etc.) in image metadata and then returns this image metadata to the remote computer system in Block S142. In another example, the remote computer system generates an empty label layer scaled to the geometry of the LIDAR frame, writes an object type from the manual label into regions of the label layer corresponding to the manually-defined location, writes an ID from the LIDAR frame to the label layer, and returns the label layer to the remote computer system.

However, the annotation portal can store manual labels and related data entered by the human annotator for LIDAR frames in any other format in Block S142. The annotation portal can similarly store manual labels and related data entered by the human annotator for video feeds.

9. Label Conflicts

Block S150 of the method S100 recites, in response to the first manually-defined location approximating the first automatically-defined location and in response to the first manual label differing from the first automated label, serving the first optical image, the first manual label, and the first automated label to the annotation portal for manual confirmation of one of the first manual label and the first automated label proximal the first manually-defined location; and Block S152 of the method S100 recites receiving confirmation of one of the first manual label and the first automated label proximal the first manually-defined location from the human annotator via the annotation portal. (Block S150 can similarly recite, in response to the first manual label differing from the first automated label serving the first optical image, the first manual label, and the first automated label to a set of annotation portals for manual confirmation of one of the first manual label and the first automated label for the first optical image by a set of human annotators; and Block S152 can similarly recite receiving confirmations of one of the first manual label and the first automated label for the first optical image from the set of human annotators in Block S152.)

Generally, in Blocks S150 and S152, the remote computer system: detects differences between a manual label entered by the human annotator and an automated label calculated by the remote computer system (e.g., via the neural network) for a particular frame or for a particular region of a frame; and then executes a process to collect additional information from the same human annotator and/or other human annotators to determine whether the manual label or the automated label (or both) is correct.

9.1 Conflict Detection

Generally, the remote computer system can compare object types represented by manual and automated labels and proximities of the manually-defined and automatically-defined locations of these labels attributed to an optical image to detect label conflicts.

In one example in which manual and automated labels define areas within the optical image, the remote computer system links these manual and automated labels if their corresponding areas overlap or overlap by a sufficient proportion (e.g., at least 20% by intersection over union), such as shown in FIGS. 1 and 3. In another example, the remote computer system: calculates centroids of areas attributed to the manual and automated labels within the optical image; calculates a distance between these centroids, such as in pixels or in a real distance; and links the manual and automated labels if this distance remains below a threshold distance. For example, the threshold distance can be linked to a type of the manual or automated label, such as a threshold distance of two meters for vehicle-type labels and a threshold distance of one half of a meter for pedestrian-type labels. The remote computer system can implement similar methods to link manual and automated labels attributed to points or lines within the optical image.

Once manual and automated labels attributed to the optical image are linked by their locations, the remote computer system can determine that the manual and automated labels agree if their types are identical or substantially similar (e.g., commercial vehicle-type manual label versus vehicle-type automated label) and then add the optical image—with the manual label—to the training set for future retraining of the neural network. However, the remote computer system can detect a label conflict if the manual and automated labels specify different or substantially different (e.g., commercial vehicle-type manual label versus motorcycle-type automated label) and then initiate Blocks S150 and S152 to involve human annotators to manually check these labels. Similarly, if a manual label is attributed to a manually-defined location in the optical image but no automatic label is attributed to the same or similar automatically-defined location in the optical image, or vice versa, the remote computer system can detect a label conflict in the optical image and flag the optical image for manual review accordingly in Blocks S150 and S152.

The remote computer system can implement similar methods and techniques to link manual and automated labels attributed to a sequence of optical images in a LIDAR or video feed. Furthermore, because manual and automated labels of the same type and attributed to like locations within a LIDAR feed may not be activated and deactivated concurrently (i.e., in the same frames in the LIDAR feed), the remote computer system can confirm alignment between the manual and automated labels if: the manual and automated labels are of the same or substantially similar type; the manually-defined and automatically-defined locations of the manual and automated labels overlap or fall within a threshold distance of one another while the manual and automated labels are active in the LIDAR feed; and the manual and automated labels are activated and deactivated within a threshold time of one another, such as within two seconds, within ten frames, or within a duration or frame count proportional to a total time that the manual and automated labels are both active in the video feed (e.g., one second per ten seconds of active manual and automated labels), as shown in FIG. 3. Therefore, the remote computer system can track times within a LIDAR feed in which manual and automated labels are activated and deactivated to both: accommodate for minor differences in detection and labeling of objects—entering and exiting a field represented by the LIDAR field—by human annotators and the neural network; and to trigger further manual verification of activation and deactivation times for labels in the LIDAR feed if more significant temporal deviations are detected, which may otherwise be indicative of deficiencies in the neural network.

If such temporal label conflicts are detected in a LIDAR feed, the remote computer system can flag all or a segment of the LIDAR feed for manual confirmation of attributed labels. For example, the remote computer system can flag: the full duration of the LIDAR feed; a union of durations of the LIDAR in which the manual and automated labels are active; a duration of the LIDAR feed around conflicting manual and automated label activation times; or a duration of the LIDAR feed around conflicting manual and automated label deactivation times. The remote computer system can then return the flagged segment of the LIDAR feed to human annotators for verification of labels, their locations, and the activation and deactivation times in Blocks S150 and S152.

The remote computer system can implement similar methods and techniques to detect label conflicts between manual and automated labels attributed to a video feed and to flag segments of the video feed for manual verification of labels by human annotators in Blocks S150 and S152. However, the remote computer system can implement any other methods or techniques to detect label conflict between AI-supplied and human-supplied labels for LIDAR and video data and to trigger further additional manual confirmation of the label when such defects are detected prior to incorporating these LIDAR and video data into the training set for retraining of the neural network.

9.2 Prompt Additional Human Supervision

Once the remote computer system detects a label conflict in an optical image, the remote computer system can return the optical image to the same human annotator and/or to other human annotators for confirmation of the object type and location of a label attributed to the optical image in Block S150. Similarly, once the remote computer system detects a label conflict in a LIDAR (or video) feed, the remote computer system can return the LIDAR feed to the same human annotator and/or to other human annotators for confirmation of the object type, locations, activation time, and deactivation time of a label attributed to the LIDAR feed in Block S150.

In one implementation, upon receipt of a flagged optical image for which the manually-defined and automatically-defined locations match but for which the manual and automated labels differ, the annotation portal can: render the optical image; render the manual label and the automated label pointing to the corresponding manually-defined location (or to a union of the manually-defined and automatically-defined locations) on the optical image; and render a prompt to select one of the manual and automated labels to confirm a type of an object represented at or near the manually-defined location within the first optical image. In particular, the annotation portal can render the manual and automated labels side by side—such as adjacent or over the manually-defined location—and prompt the human annotator to select the more accurate of the two labels. The annotation portal can also enable the human annotator to cancel both the manual and automated labels and to select an alternate object type for a label applied to this region of the optical image.

In another implementation shown in FIG. 1, upon receipt of a flagged optical image for which the manual and automated labels are identical for two manually-defined and automatically-defined locations separated by more than a threshold distance, the annotation portal can: render the optical image; render a label specifying the object type of the manual label and automated labels and pointing separately to each of the manually-defined location and the automatically-defined location on the optical image; and render a prompt to select one of the manually-defined and automatically-defined locations. The annotation portal can also enable the human annotator to cancel both the manually-defined and automatically-defined locations and to select an alternate location of the label in the optical image.

In yet another implementation, upon receipt of a flagged optical image for which a manual label is applied to a manually-defined location but for which an automated label of a similar type or in a nearby location does not exist, the annotation portal can: render the optical image; render the manual label at the manually-defined location; and render a prompt to confirm the object type and location of the manual label. The annotation portal can also enable the human annotator to cancel the manual label or otherwise adjust the object type and/or location of the manual label in the optical image. The annotation portal can implement similar methods and techniques to handle a flagged optical image for which an automated label is applied to an automatically-defined location but for which a manual label of a similar type or in a nearby location does not exist.

The annotation portal can implement similar methods and techniques to prompt a human annotator to verify conflicting labels attributed to LIDAR and/or video feeds. Furthermore, upon receipt of a flagged segment of a LIDAR (or video) feed for which types and locations of a manual label and an automated label match but for which an activation time within the segment differs by more than a threshold duration, the annotation portal can: replay the segment of the LIDAR feed; render the manual label at the manually-defined location at a manually-set activation time during replay of the segment of the LIDAR feed; render the automated label at the automatically-defined location at an automatically-set activation time during replay of the segment of the LIDAR feed; and render a prompt to confirm the activation time of one of the manual and automated labels. The annotation portal can also enable the human annotator to set a new start time for this label in the LIDAR feed segment. The annotation portal can implement similar methods and techniques to detect significant differences between deactivation times of the manual and automated labels in a segment of a LIDAR feed, and the annotation portal can implement similar methods and techniques to handle such label conflicts in video feeds.

The annotation portal can then return the human annotator's responses to the remote computer system via a computer network in Block S152.

9.3 Human Supervision by Other Human Annotators

As shown in FIGS. 1 and 3, the remote computer system can interface with multiple instances of the annotation portal to serve optical images containing label conflicts to other human annotators and to collect verification data from these other human annotators. For example, the remote computer system can: serve an optical image, a manual label, and an automated label for label conflict resolution to each of multiple annotation portals associated with multiple human annotators—such as including the human annotator who supplied the manual label originally—in Block S150; and receive manual confirmation of one of the manual label and the automated label for the optical image and average or otherwise combine responses (e.g., object types, label locations, activation times, deactivation times, etc.) from these human annotators into a final manually-confirmed label for the optical image in Block S152. For example, for the optical image including a manual label differing from an automated label but occurring at the same location within the optical image as the automated label, the remote computer system can calculate a binary combination (e.g., either the manual label or the automated label) of: a first confirmation of one of the first manual label and the first automated label received from a first human annotator in the set; a second confirmation of one of the first manual label and the first automated label received from a second human annotator in the set; etc. The remote computer system can then append the training set with the optical image and the binary combination in Block S114 and retrain the neural network accordingly in Block S124.

The remote computer system can thus: collect a manual label for an optical image from one human annotator; compare this manual label to an automated label generated by the neural network; expand review of the optical image to multiple (e.g., three, dozens) human annotators if the manual and automated labels differ; and then merge feedback from these multiple human annotators into a final label (e.g., a final object time, label location, activation time, and/or deactivation time) for the optical image. Therefore, the remote computer system can limit consumption of human time and volume of data transmitted to local computer systems per labeled optical image or per labeled feed while also maintaining high data quality by selectively collecting additional feedback from human annotators when label conflicts—indicating that a human annotator or the neural network was incorrect—are detected.

Furthermore, in this implementation, if a set of human annotators overwhelmingly confirm an automated label attributed to an optical image (or to a greater LIDAR or video feed), the remote computer system can return the optical image, the manual label, the automated label, and training information for distinguishing types of the manual and automated labels to the human annotator who originally supplied the manual label, thereby providing closed-loop feedback to this human annotator to improve the human annotator's training and skill in manually detecting and labeling objects in optical images. In particular, the remote computer system can selectively serve training data to a human annotator based on manual labels—received from the human annotator—that conflict with labels provided or confirmed for the same optical images by other human annotators and/or by the neural network.

9.4 Conflict Resolution

In one variation shown in FIG. 3, if the human annotator or set of human annotators confirm that the automated label was correct for the optical image (or LIDAR or video feed), the remote computer system can determine that the label conflict arose from human error, discard the manual label, and insert the optical image with the automated label into the training set. However, if the human annotator or set of human annotators confirm that the automated label was incorrect (e.g., the manual label was correct) for the optical image (or LIDAR or video feed), the remote computer system can determine that the neural network is not deficient in detecting the object type of the manual label (and the object type of the automated label), which may be due to improper or low quality labels on optical images in the training set. The remote computer system can then flag a subset of optical images in the training set containing related labels for verification by human annotators.

In one implementation shown in FIG. 3, upon receipt of confirmation that a manual label of a first object type is correct (and that a conflicting automated label of a second object type is incorrect) in an optical image (or in a LIDAR or video feed), the remote computer system can: aggregate a subset of optical training images, from the training set, containing labels of the second type in Block S160; distribute the subset of optical training images to a set of annotation portals for manual confirmation of labels of one of the first object type and the second object type by a set of human annotators in Block S162; and then receive confirmations of labels of one of the first type and the second type for the subset of optical training images from the set of human annotators via the set of annotation portals in Block S164. In particular, the remote computer system can aggregate optical training images—from the training set—containing labels of the second object type represented by the automated label in Block S160, since training on these optical training images and labels of the second object type may have contributed to the neural network identifying an object represented in the optical image as of the second object type rather than the correct first object type. By returning these optical training images to human annotators for verification, the remote computer system can enable human annotators to detect and correct labels of the second object type that should be labels of the first object type. For example, an instance of the annotation portal can: render an optical training image with labels for both the first object type and the second object type at a location originally attributed to the label of the second object type in the optical training image; and prompt a human annotator to confirm one of these labels or insert a label for a different type of object into the optical training image, such as according to methods and techniques described above.

The remote computer system can return each of these optical training images to multiple human annotators for verification in Block S162 and then merge feedback from these human annotators into final labels for these optical training images, as described above in Block S164. The remote computer system can then add the (new) optical image with the final label to the training subset and correct, where necessary, labels attributed to this subset of optical training images in the training set in Block S114 before retraining the neural network in Block S124.

The remote computer system can implement similar methods and techniques to retest or verify segments or entire LIDAR feeds and/or video feeds.

Therefore, in response to detecting a single label conflict between a manual label and an automated label in Block S150 and then receiving additional verification that the manual label is correct and/or that the automated label is incorrect, the remote computer system can cascade verification of a label in this single optical image to verification of labels across a larger set of optical images that were previously labeled without detected conflicts, thereby allocating resources (i.e., human labeling time and transmission of optical data to the local computer systems) proportional to the likelihood that labels attributed to optical images are incorrect. In particular, the remote computer system can implement this process to detect hard negatives in objects identified by the neural network and to correct the training set with selective, strategic injection of additional human supervision. The remote computer system can thus refine and improve the quality of labeled data in the training set over time in Block S114 and retrain the neural network accordingly in Block S124.

9.5 Selective Conflict Resolution

In the foregoing variation, in response to confirmation of a manual label and rejection of a corresponding automated label—generated by the neural network in Block S132—in an optical image, the remote computer system can selectively aggregate a subset of previously-labeled optical training images for verification based on a confidence score calculated by the neural network for correctness of the automated label. In particular, if the neural network calculated a confidence score above a threshold confidence value (e.g., 60%) for the automated label that was later verified as incorrect in a new optical image by human annotators (e.g., by confirming the manual label over the automated label) in Block S152, the remote computer system can execute Blocks S160, S162, and S162 (shown in FIG. 3) to verify labels in optical training images from the training set that may have contributed to this incorrect identification of an object in the new optical image. However, if the neural network calculated a confidence score below the threshold confidence value for the automated label that was later verified as incorrect in a new optical image by human annotators (e.g., by confirming the manual label over the automated label) in Block S152, the remote computer system can attribute the incorrect label in the new optical image to insufficient quantity of like training data in the training set, add the new optical image and the verified manual label to the training set directly in Block S114, and forego reexamination of optical training images in the training set.

However, the remote computer system can selectively execute Blocks S160, S162, and S164 in response to any other trigger or event.

10. Retraining the Neural Network

Block S114 of the method S100 recites appending the training set with the first optical image including one of the first manual label and the first automated label based on confirmation received from the human annotator (or based on confirmation received from the set of human annotators through the set of annotation portals); and Block S124 of the method S100 recites retraining the neural network, with the training set, to identify objects in optical images in Block S124. Generally, once a new optical image is labeled and this label is confirmed, as described above, the remote computer system can add the new optical image to the training set in Block S114 and then retrain the neural network on this expanded training set in Block S124, such as according to methods and techniques described above, as shown in FIGS. 1 and 3.

The remote computer system can then push a copy of the neural network (or a simplified version of the neural network) to the road vehicle for implementation during autonomous execution of a subsequent route.

Therefore, by hosting manual insertion of localization and perception labels into a new optical image or into a new LIDAR or video feed and checking these manual (localization and perception) labels against automated labels generated by the localization/perception neural network, the remote computer system can identify potentially low-quality (e.g., incorrect) manual labels. The remote computer system can then selectively allocate additional resources—including human annotator time and transmitted data volume—to confirm or correct these manual labels before retraining the localization/perception neural network on these labeled optical data, thereby maintaining a greater accuracy and effectiveness of the localization/perception neural network in automatically interpreting localization- and perception-related objects in unlabeled LIDAR and/or video feeds. The remote computer system can also implement these processes to detect incorrect labels in video feeds in the training set and to selectively correct these labels, thereby further improving both the training set and the localization/perception neural network that is trained on this training set.

The localization/perception neural network can thus be loaded onto an autonomous vehicle and regularly updated as the remote computer system grows the training set and retrains the localization/perception neural network over time. When operated in an autonomous driving mode, the autonomous vehicle can implement the localization/perception neural network to locate itself in real space and to perceive its local environment. When coupled with a motion planning and navigation model, as described below, the localization/perception neural network can thus enable the autonomous vehicle to autonomously navigate along public roads toward a selected destination.

11. Navigational Labels

Figure 4:
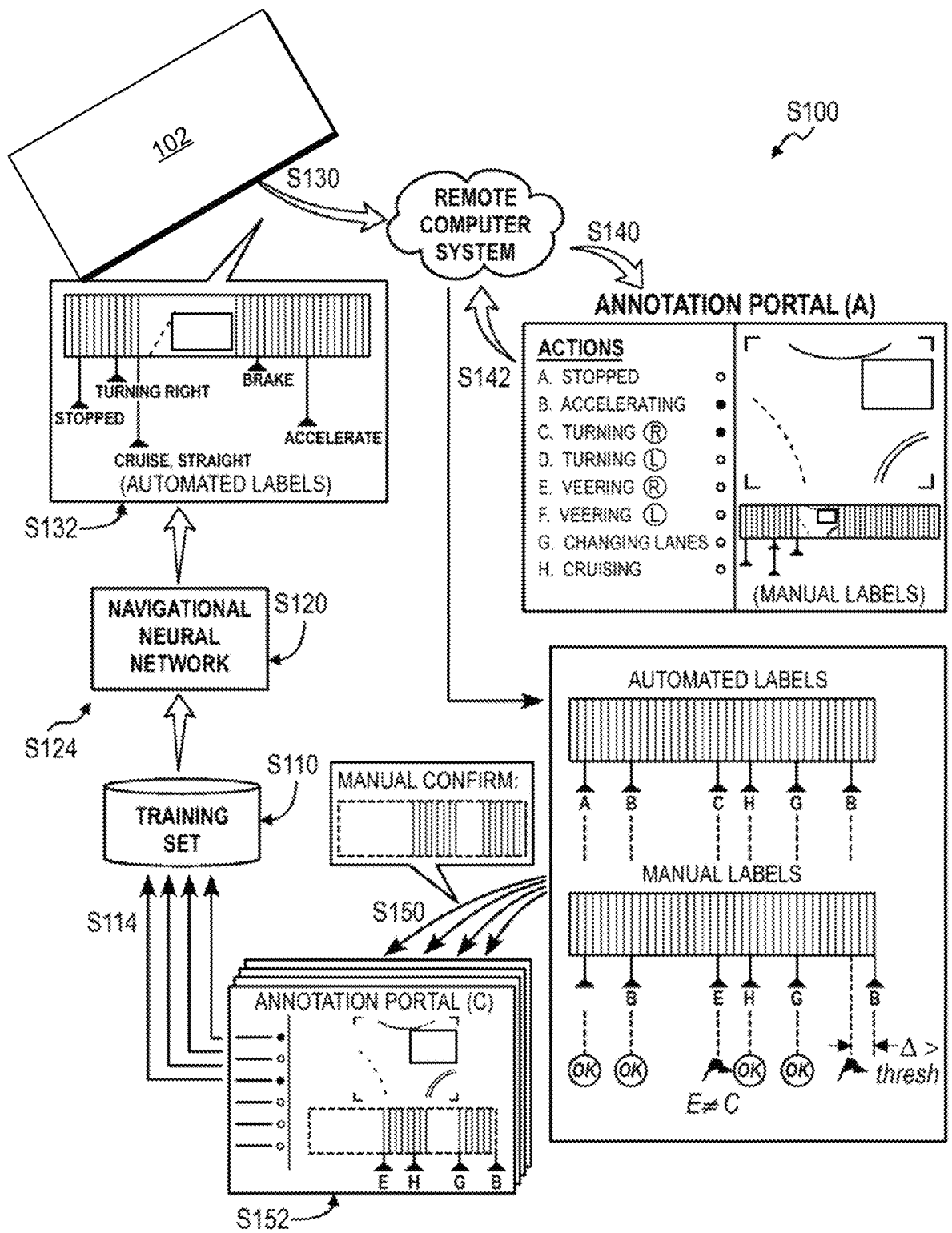
FIG. 4 is a flowchart representation of one variation of the method.
Figure 5:
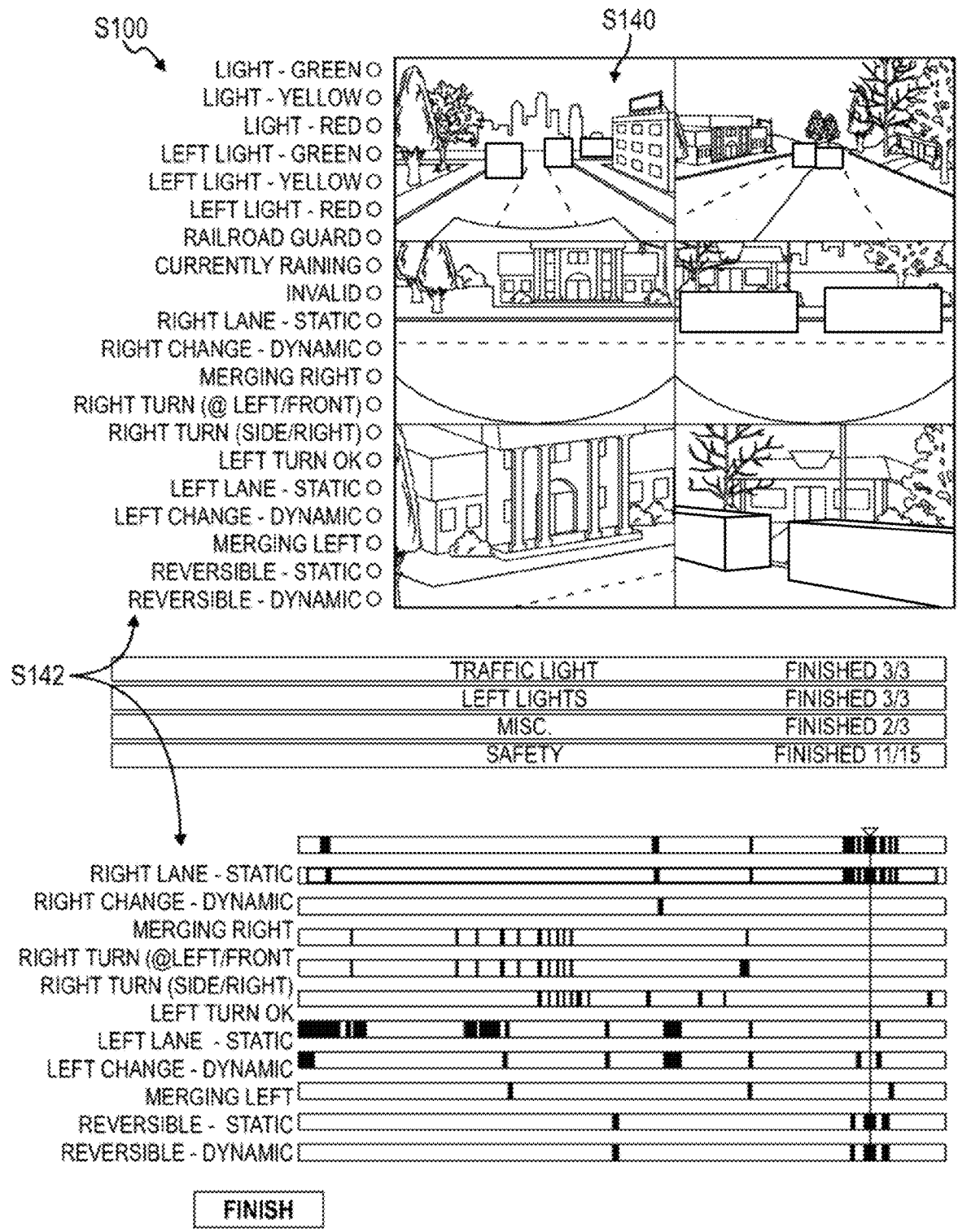
FIG. 5 is a graphical representation of one variation of the method.

As shown in FIGS. 4 and 5, one variation of the method S100 for training and refining an artificial intelligence includes: accessing a training set including discrete sequences of optical images in Block S110, each discrete sequence of optical images in the training set including a label linked to a navigational action represented in the discrete sequence of optical images; training a neural network, with the training set, to identify navigational actions represented in sequences of optical images in Block S120; receiving a first sequence of optical images recorded by an optical sensor integrated into a road vehicle in Block S130, the first sequence of optical images recorded during operation of the road vehicle; passing the first sequence of optical images through the neural network to generate a first automated label attributed to the first sequence of optical images in Block S132; serving the first sequence of optical images to a first annotation portal executing on a first local computer system for manual labeling in Block S140; receiving a first manual label attributed to the first sequence of optical images by a first human annotator at the first local computer system in Block S142; in response to the first manual label differing from the first automated label in the first sequence of optical images, serving the first sequence of optical images, the first manual label, and the first automated label to a set of annotation portals for manual confirmation of one of the first manual label and the first automated label for the first sequence of optical images by the first set of human annotators in Block S150 and receiving confirmation of one of the first manual label and the first automated label for the first sequence of optical images from the set of human annotators through the set of annotation portals in Block S152; appending the training set with the first sequence of optical images including one of the first manual label and the first automated label based on confirmation received from the set of human annotators in Block S114; and retraining the neural network, with the training set, to identify navigational actions in discrete sequences of optical images in Block S124.

11.1 Applications

Generally, in this variation, the remote computer system can implement methods and techniques similar to those described above: to serve a video feed (and/or a LIDAR feed) to a human annotator for insertion of manual navigation-type labels; to compare these manual navigation-type labels to automated navigation-type labels generated by a navigational neural network to detect label conflicts, such as based on label types, activation times, and deactivation times; to prompt verification of navigation-type labels by additional human annotators in response to detecting label conflicts; and to grow a training set for training and refining the navigational neural network. In particular, the remote computer system can implement methods and techniques similar to those described above to label video feeds with actions (e.g., turning, veering, accelerating, braking) performed by the road vehicle while the video feed was recorded by a camera or other optical sensor integrated into the road vehicle rather than label distinct objects (e.g., other vehicles, pedestrians, lane markers) captured in frames in the video feed.

11.2 Navigation Neural Network

As in Blocks S110 and S120 described above, the remote computer system can access: a training set including video feeds, each including a sequence of optical images and a label identifying a navigational action represented in the video feed; and then train a neural network, with the training set, to identify navigational actions represented in video feeds.

11.3 Video Feed+Automated Navigational Label

As in Blocks S130 and S132 described above, the remote computer system can: receive a new video feed recorded by an optical sensor—integrated into a road vehicle—during operation of the road vehicle; and pass the first sequence of optical images through the neural network to generate a first automated label attributed to the first sequence of optical images.

For the video feed recorded during manual operation of the road vehicle, the remote computer system can pass the video feed through the navigational neural network for attribution of an automated navigational label, such as representing one of various predefined navigational actions and states including: accelerating, coasting, actively braking, turning left, turning right, veering left, veering right, changing lanes, turning into a different lane, swerving, drifting out of a lane, wandering between lanes, stopped, reversing, clipping a curb, etc. As described above, the navigational neural network can also attribute a start (i.e., activation) time and a stop (i.e., deactivation) time for this navigational label in the video feed to indicate a duration over which the action specified by the navigational label occurred in the video feed. In this implementation, the remote computer system can receive GPS, inertial (e.g., accelerometer, gyroscope, compass) data, steering angle, accelerator position, brake pedal position, and/or other data collected by the road vehicle during recordation of the video feed to determine or confirm a navigational label and activation and deactivation times for this navigational label thus attributed to the video feed.

Alternatively, the road vehicle can include an autonomous vehicle, and the video feed can be recorded and labeled by the autonomous vehicle locally during autonomous execution of a route before being uploaded to the remote computer system. In this implementation, the remote computer system can pass the video feed through a local version of the navigational neural network—executing on the road vehicle—to select a next action for executing by the road vehicle in real-time and then write a navigational label identifying this action to each frame in the video feed recorded during execution of this next action by the autonomous vehicle.

However, the remote computer system can collect a video feed and attribute a navigational label to the video feed in any other way in Blocks S130 and S132.

11.4 Manual Annotation

As in Blocks S140 and S142 described above, the remote computer system can then serve the new video feed to an annotation portal—executing on a local computer system—for manual labeling by a human annotator; and then receive a manual navigational label attributed to the new video feed by the human annotator.

In one implementation, as the video feed replays at the annotation portal, the annotation portal: enables the human annotator to activate and deactivate various predefined navigational actions; records timestamps of frames at which discrete types of navigational actions are manually activated and deactivated by the human annotator; aggregates these navigational actions, manually activation and deactivation timestamps, and an identifier of the video feed into a unique manual label packet; and returns the manual label packet to the remote computer system in Block S142. For example, the annotation portal can render a set of radio buttons labeled within navigational actions inside a side bar adjacent a window in which the video feed in replayed, as shown in FIG. 5.

During replay of the video feed, the human annotator can set at least one navigational action to inactive for each frame of the video feed. For example, while the video feed shows the road vehicle as stopped, the human annotator can set the "stopped" radio button to inactive. Once the video feed shows the road vehicle as accelerating, the human annotator can set the "accelerating" radio button to inactive, and the annotation portal can automatically deactivate the "stopped" radio button. As the video feed begins to show the road vehicle as turning left while continuing to accelerate, the human annotator can set the "turning left" radio button to active, and the annotation portal can maintain the "accelerating" radio button as active. Once the video feed no longer shows the road vehicle as accelerating, the human annotator can set a "cruising" radio button to active, and the remote computer system can automatically deactivate the "accelerating" radio button; similarly, once the video feed no longer shows the road vehicle as turning left, the human annotator can set the "turning left" radio button to inactive. If the human annotator further detects that the autonomous vehicle is swerving, drifting out of a lane, or otherwise wandering across a road surface while continuing to move forward at an approximately constant speed in the video feed, the human annotator can set a "swerving," "drifting," or "wandering" radio button as active, and the annotation portal can maintain the "cruising" radio button as active. As the video feed later shows the road vehicle to be actively slowing, the human annotator can set a "braking" radio button to active, and the annotation portal can automatically deactivate the "cruising" radio button. Furthermore, the human annotator can selectively activate one of a "slowing with traffic," slowing due to traffic ahead," "slowing for red traffic signal," slowing for pedestrian crosswalk," or "slowing for stop sign," radio button based on features visible—to the human annotator—ahead of the road vehicle in the video feed, thereby providing greater resolution to navigational actions represented in the video feed.

Furthermore, as the human annotator manually activates and deactivates these navigational actions during replay of the video feed, the annotation portal can reorder available navigational actions rendered in the side bar according to a most likely next navigational action based on navigational actions that the human annotator has currently set as active in order to streamline selection of navigational actions by the human annotator during playback of the video feed, thereby yielding more accurate activation times and deactivation times for these navigational actions. For example, when a "cruising, highway" radio button is active, the annotation portal can render, in order from the top of the side bar, "cruising, highway," "braking," "changing lanes, left," "changing lanes, right," "accelerating," and "veering left," etc. radio buttons. Similarly, when a "braking" radio button is active, the annotation portal can render, in order from the top of the side bar, "braking," "stopped," "turning left," "turning right," "cruising," and "accelerating," etc. radio buttons.

The annotation portal can also: access a sequence of automated navigational labels attributed to the video feed by the road vehicle or by the remote computer system via the navigational neural network in Block S132; and automatically activate and deactivate (and reorder) navigational actions rendered in the sidebar adjacent the video feed—as the video feed replays in the annotation portal—according to this sequence of automated navigational labels. The human annotator can then manually deactivate automated navigational actions if determined to be incorrect and manually activate other navigational labels not properly set as active by the road vehicle or navigational neural network.

As the human annotator sets these navigational actions as active and deactivate, such as through a set of radio buttons in the side bar, throughout replay of the video feed, the annotation portal can aggregate activation and deactivation times of these navigational actions into a manual label packet and return this manual label packet to the remote computer system in Block S142.

However, the remote computer system can cooperate with the annotation portal to collect manual navigational labels from the human annotator in any other way and in any other format.

11.5 Navigation Label Conflicts

The remote computer system can then: detect label conflicts between automated navigational labels generated by the road vehicle or by the navigational neural network and manual navigational labels supplied by the human annotator for the video feed, such as including differences in navigation action, deviations in activation time of the same navigational action, and deviations in deactivation time of the same navigational action. In particular, and as in Blocks S150 and S152 described above, the remote computer system can detect navigational label conflicts for a video feed, return this video feed to multiple human annotators for confirmation of these navigational labels or entire relabeling of the video feed with a new sequence of navigational actions, and then compile responses from these human annotators into a final sequence of navigational labels for the video feed.

In one example, in response to a manual navigational label supplied by one human annotator differing from an automated navigational label in a segment of the video feed, the remote computer system can: flag this segment for a navigational action conflict; return this segment of the video feed—and additional frames (e.g., five seconds of frames) preceding and succeeding the segment—to multiple human annotators for confirmation of one of the manual and automated navigational labels for this segment in Block S150; compile responses from these multiple human annotators into a final navigational label for the segment; update the video feed with this final navigational label in Block S152; and append the training set with the video feed for retraining of the navigational neural network.

In another example, in response to a manually-defined activation time of the manual navigational label differing from an automatically-defined activation time of the automated navigational label by more than a threshold time (e.g., two seconds), the system can: flag the video feed for a time conflict; and implement methods and techniques described above to collect additional navigational label feedback from multiple human annotators to verify the activation time of this navigational label.

However, the remote computer system can detect and respond to navigational label conflicts in any other way in Blocks S150 and S152 before inserting the new video feed and navigational labels into the training set for subsequent retraining of the navigational neural network. However, if no navigational label conflict is detected for the new video feed, the remote computer system can add the new video feed and corresponding navigational labels, activation times, and deactivation times to the training set in Block S114.

Furthermore, the remote computer system can selectively return video feeds (or segments of video feeds) from the training set to be verified or relabeled by human annotators in Blocks S160, S162, and S164 described above, such as if an automated navigational action for which the neural network output a high degree of confidence conflicted with a manual navigational label supplied and confirmed by multiple human annotators.

11.6 Retraining the Navigational Neural Network

As in Blocks S114 and S124 described above, the remote computer system can then: append the training set with the new video feed, including confirmed or final navigational labels, activation times, and deactivation times; and retrain the navigational neural network accordingly.

Therefore, by hosting manual insertion of navigational labels into a new video feed and checking these manual navigational labels against automated navigational labels generated by the navigational neural network, the remote computer system can identify potentially low-quality manual navigational labels. The remote computer system can then selectively allocate additional resources—including human annotator time and transmitted data volume—to confirming or correcting these manual navigational labels before retraining the navigational neural network on these labeled video feeds, thereby maintaining a greater accuracy and effectiveness of the navigational neural network in automatically interpreting navigational actions in unlabeled video feeds. The remote computer system can also implement these processes to detect incorrect navigational labels in video feeds in the training set and to selectively correct these navigational labels, thereby further improving both the training set and the navigational neural network that is trained on this training set.

As the remote computer system develops the navigational neural network according to the method S100 and as the navigational neural network thus improves in accuracy and effectiveness over time, unlabeled video feeds can be fed into the navigational neural network to automatically identify navigational actions in these video fees with a high degree of confidence and without additional human supervision. The remote computer system can then implement these video feeds and automated navigational labels to develop and refine a robust motion planning and navigation model, such as to mimic manual driving of road vehicles by humans. This motion planning and navigation model can then be loaded onto an autonomous vehicle to enable the autonomous vehicle to execute navigational actions similar to humans, which may enable the autonomous vehicle to integrate onto roads traversed by both autonomous vehicles and vehicles operated manually by humans.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. One or more tangible non-transitory computer-readable storage media storing computer-executable instructions for performing a computer process on a computing system, the computer process comprising:
    receiving an optical image;
    receiving a manual label attributed to a manually-defined location on the optical image;
    generating an automated label attributed to an automatically-defined location on the optical image, the automated label generated by passing the optical image through a neural network, the neural network trained with an initial training set to identify a set of objects within a population of optical images;
    generating a new training set by appending the initial training set with the optical image, the optical image including one of the manual label or the automated label based on a confirmation by an annotator; and
    training the neural network with the new training set.

2. The one or more tangible non-transitory computer-readable storage media of claim 1, wherein the initial training set includes a plurality of optical images, each of the plurality of optical images including a label identifying an object.

3. The one or more tangible non-transitory computer-readable storage media of claim 1, wherein the optical image is recorded during operation of a vehicle.

4. The one or more tangible non-transitory computer-readable storage media of claim 1, wherein the confirmation by the annotator includes a selection of the manual label or the automated label, the selection being made when the manually-defined location approximates the automatically-defined location and the manual label differs from the automated label.

5. The one or more tangible non-transitory computer-readable storage media of claim 1, wherein the confirmation is made based on an object type of an object located proximal to the manually-defined location.

6. The one or more tangible non-transitory computer-readable storage media of claim 1, wherein the optical image is received from a LIDAR feed recorded during operation of a vehicle, the optical image comprising a frame in the LIDAR feed and a point cloud representing external surfaces in a field of view at a time the optical image was recorded.

7. The one or more tangible non-transitory computer-readable storage media of claim 6, wherein the first manual label is linked to a point cluster of one or more points in the point cloud and the first manually-defined location is defined based on a position of the point cluster.

8. The one or more tangible non-transitory computer-readable storage media of claim 6, wherein one or more digital photographic images of a video feed of a field are rendered simultaneously with the LIDAR feed.

9. The one or more tangible non-transitory computer-readable storage media of claim 8, wherein one or more digital photographic images of a second video feed of a second field different than the field are rendered, the video feed being captured with a camera, and the second video feed being captured with a second camera, the one or more digital photographic images of the video feed being linked to a first sector of the LIDAR feed based on a known position of the camera, the one or more digital photographic images of the second video feed being linked to a second sector of the LIDAR feed based on a known position of the second camera.

10. The one or more tangible non-transitory computer-readable storage media of claim 9, wherein the one or more digital photographic images of the video feed are rendered in connection with the annotator interacting with the first sector and the one or more digital photographic images of the second video feed are rendered in connection with the annotator interacting with the second sector.

11. The one or more tangible non-transitory computer-readable storage media of claim 6, wherein a subset of points representing a ground surface in the field of view are removed from the point cloud of the optical image, remaining points in the point cloud being compressed in the optical image onto a horizontal plane to form a plan point cloud.

12. The one or more tangible non-transitory computer-readable storage media of claim 1, wherein a digital photographic image is temporarily aligned to the optical image, the digital photographic image approximating a two-dimensional view, the manual label from the optical image being projected onto a location in the digital photographic image corresponding to the manually-defined location.

13. The one or more tangible non-transitory computer-readable storage media of claim 1, wherein the manual label differs from the automated label and the confirmation includes selecting the manual label, the new training set including the optical image and the manual label and a subset of optical training images from the initial training set with labels having a confirmed type.

14. The one or more tangible non-transitory computer-readable storage media of claim 1, wherein a confidence score is calculated for the automated label.

15. The one or more tangible non-transitory computer-readable storage media of claim 14, wherein the new training set is generated in response to the confidence score being below a threshold score.

16. The one or more tangible non-transitory computer-readable storage media of claim 1, wherein a second optical image is received, the second optical image succeeding the optical image in a subset of frames, a second manual label being attributed to a second manually-defined location on the second optical image, the manual label and the second manual label each defining a dynamic object type.

17. The one or more tangible non-transitory computer-readable storage media of claim 16, wherein a frame between the optical image and the second optical image is excluded from the subset of frames, a location and a label of the dynamic object type in the frame being interpolated based on the first manually-defined location and the second manually-defined location.

18. The one or more tangible non-transitory computer-readable storage media of claim 1, wherein the manual label represents a fixed infrastructure object.

19. The one or more tangible non-transitory computer-readable storage media of claim 1, wherein the initial training set is further appended with a binary combination of the confirmation by the annotator and a second confirmation by a second annotator.

20. The one or more tangible non-transitory computer-readable storage media of claim 1, wherein the initial training set includes a discrete sequence of optical images each comprising a label identifying a navigational action of a vehicle.

* * * * *